(12) United States Patent
Bowman et al.

(10) Patent No.: US 9,551,414 B2
(45) Date of Patent: Jan. 24, 2017

(54) SYNCHRONIZER ENGAGEMENT RELATIVE SPEED-BASED FORCE PROFILE

(75) Inventors: Tyler Bowman, Peoria, IL (US); Brian Lister, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 1544 days.

(21) Appl. No.: 13/158,130

(22) Filed: Jun. 10, 2011

(65) Prior Publication Data

US 2012/0312656 A1 Dec. 13, 2012

(51) Int. Cl.
*F16H 61/04* (2006.01)
*F16D 48/06* (2006.01)
*F16H 59/46* (2006.01)

(52) U.S. Cl.
CPC ........... *F16H 61/0403* (2013.01); *F16D 48/06* (2013.01); *F16D 2500/10456* (2013.01); *F16D 2500/30406* (2013.01); *F16D 2500/70211* (2013.01); *F16D 2500/70282* (2013.01); *F16H 59/46* (2013.01); *Y10T 74/19284* (2015.01)

(58) Field of Classification Search
None
See application file for complete search history.

(56) References Cited

U.S. PATENT DOCUMENTS

| | | |
|---|---|---|
| 4,495,838 A | 1/1985 | Gooch |
| 4,603,596 A | 8/1986 | Akashi et al. |
| 4,817,776 A | 4/1989 | Tateno et al. |
| 5,910,068 A | 6/1999 | Krauss et al. |
| 6,145,398 A | 11/2000 | Bansbach et al. |
| 6,164,149 A | 12/2000 | Ohmori et al. |
| 6,364,809 B1 | 4/2002 | Cherry |
| 6,450,918 B1 | 9/2002 | Miyamoto |
| 6,474,185 B2 | 11/2002 | Hillenbrand et al. |
| 6,770,010 B2 | 8/2004 | Matsumura et al. |
| 6,884,200 B2 | 4/2005 | Shimaguchi |
| 7,025,707 B2 | 4/2006 | Katakura |
| 2002/0053248 A1* | 5/2002 | Yamamoto .............. F16H 61/32 74/336 R |
| 2007/0209898 A1* | 9/2007 | Reuschel .............. F16D 48/064 192/54.4 |
| 2011/0136607 A1* | 6/2011 | Samie .................... B60K 6/445 475/2 |

* cited by examiner

*Primary Examiner* — Edwin A Young
(74) *Attorney, Agent, or Firm* — Leydig, Voit & Mayer, Ltd.; Jeff A. Greene

(57) ABSTRACT

A synchronizer system and method allow synchronization of a plurality of rotating parts by determining a measured or calculated starting relative speed of the plurality of rotating parts, and based on the starting relative speed selecting a predetermined synchronizer force profile from among a plurality of candidate profiles for synchronizing the plurality of parts prior to engagement. The selected profile is retrieved and applied to a synchronizer between the plurality of parts to be engaged, and when the relative speed between the plurality of parts to be engaged becomes substantially zero, the plurality of parts can then be engaged to one another.

9 Claims, 5 Drawing Sheets

SYNCHRONIZER ENGAGEMENT RELATIVE SPEED-BASED FORCE PROFILE

TECHNICAL FIELD

This patent disclosure relates generally to gear synchronization, and more particularly to a system for engaging two relatively moving members via a synchronizer having an engagement force following a predetermined speed-based profile.

BACKGROUND

In the operation of motor or engine-powered transportation and/or work-producing machines, a power transmission component is typically used to convert rotary power of a given speed, torque, and direction to rotary power having a different speed, torque, and/or direction. For example, an engine output rotation may be geared down to reduce speed and increase torque. Similarly, a transmission may enable the operator to selectively reverse the power transmission output relative to the engine output direction, e.g., to provide both forward and reverse movement of the machine.

The modification of transmission characteristics is executed via the actuation and deactuation of one or more clutches or, less commonly, the meshing and unmeshing of toothed gears. The execution of the engagement of previously unengaged entities should be executed only when the rotational speeds of the entities are close enough to avoid damage to the transmission and jarring of the machine. In an automatic transmission, this task, often referred to as synchronization, is typically required in order to prevent shifts from completing while the two entities to be engaged are moving at substantially different rotational speeds.

For example, certain industrial and construction machines use a dual clutch planetary transmission to allow power upshifting and downshifting between gears, while retaining the high mechanical efficiency of a manual transmission and eliminating the typical inefficiency of an automatic transmission having a torque converter. However, to increase the durability and efficiency of the transmission, it is important to properly engage and disengage the various elements, both in terms of timing and force.

A synchronizer is a component used in a transmission to bring two rotating entities to a substantially similar rotational speed prior to full engagement. The force used to engage the synchronizer is referred to herein as a synchronizer profile. If the synchronizer engagement force is increased too rapidly, the shift will be hard, causing poor drivability and high component wear. Conversely, if the synchronizer engagement force is increased too slowly, the shift will lag, causing extensive clutch wear and poor machine response. While there have been attempts in the past to provide effective synchronizer profiles, the inventors have observed that there remains a need in the art for a system for actively controlling one or more transmission shift synchronizers to increase transmission durability and improve the user experience.

While the principles disclosed herein are directed at least in part to overcoming one or more existing disadvantages, noted or otherwise, it will be appreciated that the innovation herein is defined by the attached claims without to regard to whether and to what extent the specifically claimed embodiment overcomes one or more of the noted problems in the existing technology. Moreover, it will be appreciated that any discussion herein of any reference or publication is merely intended as an invitation to study the indicated reference itself, and is not intended to replace or supplement the actual reference. To the extent that the discussion of any reference herein is inconsistent with that reference, it will be appreciated that the reference itself is conclusive as to its teachings.

SUMMARY

In an aspect of the disclosed principles, a method is described for synchronizing a plurality of rotating parts for engagement. The method includes receiving a request for engagement of the plurality of rotating parts to one another, determining a starting relative speed of the plurality of rotating parts, and based on the starting relative speed, determining a time period over which the engagement is to occur. The method further entails selecting a predetermined synchronizer force profile for synchronizing the plurality of parts prior to engagement, retrieving and applying the selected predetermined synchronizer force profile to a synchronizer between the plurality of parts to be engaged for the determined time period over which the engagement is to occur, and when the relative speed between the plurality of parts to be engaged becomes substantially zero, engaging the plurality of parts to one another.

In another aspect, a system is described for synchronizing a plurality of rotating parts for engagement. The system includes first and second rotating parts having differing first and second speeds yielding a relative speed of rotation between them, as well as a synchronizer for reducing the relative speed of rotation between the first and second rotating parts when actuated. An included synchronizer controller is configured to receive a request for engagement of the first and second rotating parts to one another, determine a starting relative speed of the first and second rotating parts, determine a time period over which the engagement is to occur and select a predetermined synchronizer force profile for synchronizing the first and second rotating parts based on the starting relative speed. The synchronizer controller is further configured to apply the force profile to the synchronizer for the determined time period and engage the first and second rotating parts to one another when the relative speed between the plurality of parts to be engaged becomes substantially zero.

In yet another aspect, a synchronizer system is described for synchronizing first and second rotating parts. The synchronizer system includes a synchronizer for reducing the relative speed of rotation between the first and second rotating parts when actuated and a synchronizer controller configured to determine a starting relative speed of the first and second rotating parts, select a predetermined synchronizer force profile for synchronizing the first and second rotating parts from among a plurality of candidate profiles based on the starting relative speed, and apply the selected synchronizer force profile to the synchronizer.

Other features and advantages of the described principles will become apparent from reading this description in conjunction with the attached figures, of which:

DETAILED DESCRIPTION

Figure 1:
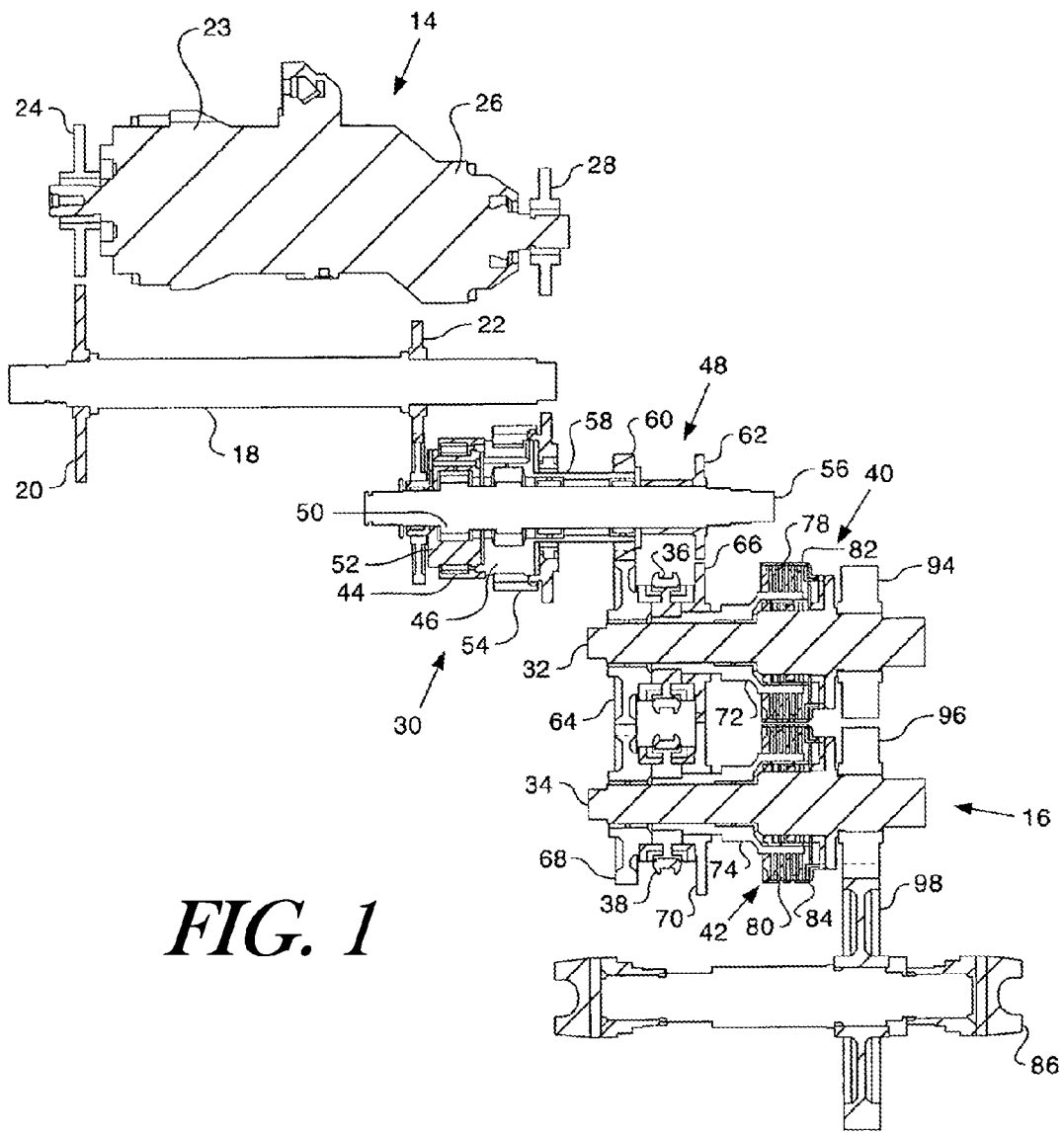
FIG. 1 is a partial cross-sectional view of a hydromechanical transmission showing transmission elements, including synchronizers, within which embodiments of the described principles may be applied.

By way of overview, FIG. 1 shows a cross-sectional view of an exemplary continuously variable transmission. The illustrated continuously variable transmission is a hydromechanical transmission 10 having a hydrostatic variator 14, and a mechanical transmission 16. An engine, not shown, drives the hydromechanical transmission 10. The engine is typically an internal combustion engine, but may be any engine or motor capable of powering the hydromechanical transmission 10 as described herein.

The engine outputs to the hydromechanical transmission 10 through an input member 18 providing split power to the hydrostatic transmission 14 and the mechanical transmission 16 through first input gear 20 and second input gear 22 respectively. The hydrostatic transmission 14 includes a variable displacement pump 23 drivingly connected to the engine through a hydrostatic transmission input gear 24, and a variable or fixed displacement motor 26, which outputs through a hydrostatic transmission output gear 28 to the mechanical transmission 16.

One skilled in the art will appreciate from the foregoing that the hydrostatic transmission 14 may also be embodied as an electric generator and electric motor, or other device capable of providing input power, without departing from the scope of the present invention. Similarly, the pump and motor of the hydrostatic transmission may be replaced with an electric motor to form an electro-mechanical transmission. The electric motor may be configured to receive electric power from a battery, a generator, or other device.

Of interest here, the mechanical transmission 16 includes a planetary arrangement 30, first output member 32 and second output member 34, first and second synchronizing assemblies, or first synchronizer 36 and second synchronizer 38, and first disc clutch assembly 40 and second disc clutch assembly 42. The planetary arrangement 30 includes first axially aligned planetary gear set 44 and second axially aligned planetary gear set 46, and a planetary output shaft 48. Each of the first axially aligned planetary gear set 44 and second axially aligned planetary gear set 46 includes a sun gear 50, a carrier 52, and a ring gear 54.

In the illustrated arrangement, the planetary output shaft 48 includes an internal shaft 56 and a sleeve 58, such as a hollow member or hub, which is supported by the internal shaft 56; the internal shaft 56 and the sleeve 58 are thus in axial alignment with each other. The internal shaft 56 connects to the respective sun gear 50 of each of the first planetary gear set 44 and the second planetary gear sets 46. The sleeve 58 outputs from the carrier 52 of the second planetary gear set 46 through a first planetary output gear 60. The internal shaft 56 outputs from the respective sun gear 50 of each of the first planetary gear set 44 and second planetary gear set 46 through a second planetary output gear 62.

The first output member 32 and second output member 34 are positioned parallel to the input member 18 and the planetary arrangement 30. The first output member 32 includes a first low-speed reduction gear 64 and a first high-speed reduction gear 66. The second output member 34 includes a second low-speed reduction gear 68 and a second high-speed reduction gear 70. Each synchronizer 36 and 38 is fixed to a first and second hub, sleeve, or rotating members 72 and 74, respectively, which rotates about the corresponding first or second output member 32 and 34. The synchronizers 36 and 38 are three-position synchronizers adapted to move from a neutral position to either of two positions, dependent on a preferred speed and direction.

Each hub 72, 74 includes at least one rotatable disc such as rotatable disc 78 and rotatable disc 80 fixed to an end of the hub 72, 74, which may be "clutched" or selectively retained by an engaging means, or first friction-disc clutch 82 and second friction-disc clutch 84, which generally overlays the rotatable disc 78 and rotatable disc 80. Together, the rotatable disc 78, rotatable disc 80, and first friction-disc clutch 82 and second friction-disc clutch 84 embody the first clutch assembly 40 and second clutch assembly 42. In one embodiment, the first clutch assembly 40 and second clutch assembly 42 are hydraulically engaged and spring-disengaged rotating frictional clutch assemblies which may be selectively engaged to provide power to the first output member 32 or second output member 34 and to a final output member 86.

The low-speed and high-speed reduction gears 64, 66, 68, and 70 freely rotate about the first output member 32 and second output member 34 while disengaged. Roller bearings 90 and 92 on the first output member 32 and second output member 34 support the low-speed and high-speed reduction gears 64, 66, 68, and 70. When either of the first or second synchronizers 36 and 38 is engaged with either of the low-speed or high-speed reduction gears 64, 66, 68, and 70, the first or second hub 72 and 74 rotates at the same revolutions per unit of time as the engaged low-speed or high-speed reduction gear 64, 66, 68, and 70.

First output shaft gear 94 and second output shaft gear 96 fixed to the first output member 32 and second output member 34 intermesh a final drive gear 98 of the final output member 86. As will be appreciated, the input member 18, planetary output shaft 48, first output member 32, second output member 34, and final output member 86 are supported within a transmission housing (not shown) and rotate about bearings, or the like, (not shown) held within the housing.

As noted above, the operation of the synchronizers has a strong affect on the usability and durability of the transmission. In an implementation of the described principles, a relative speed-based profile is selected and applied in order to engage the synchronizers with the proper force as a function of time. In particular, embodiments of the disclosed principles provide a performance benefit by allowing quicker shifts without damage when there is a small relative speed to synchronize, while still allowing synchronization of large relative speeds over a slower shift period when necessary.

Figure 2:
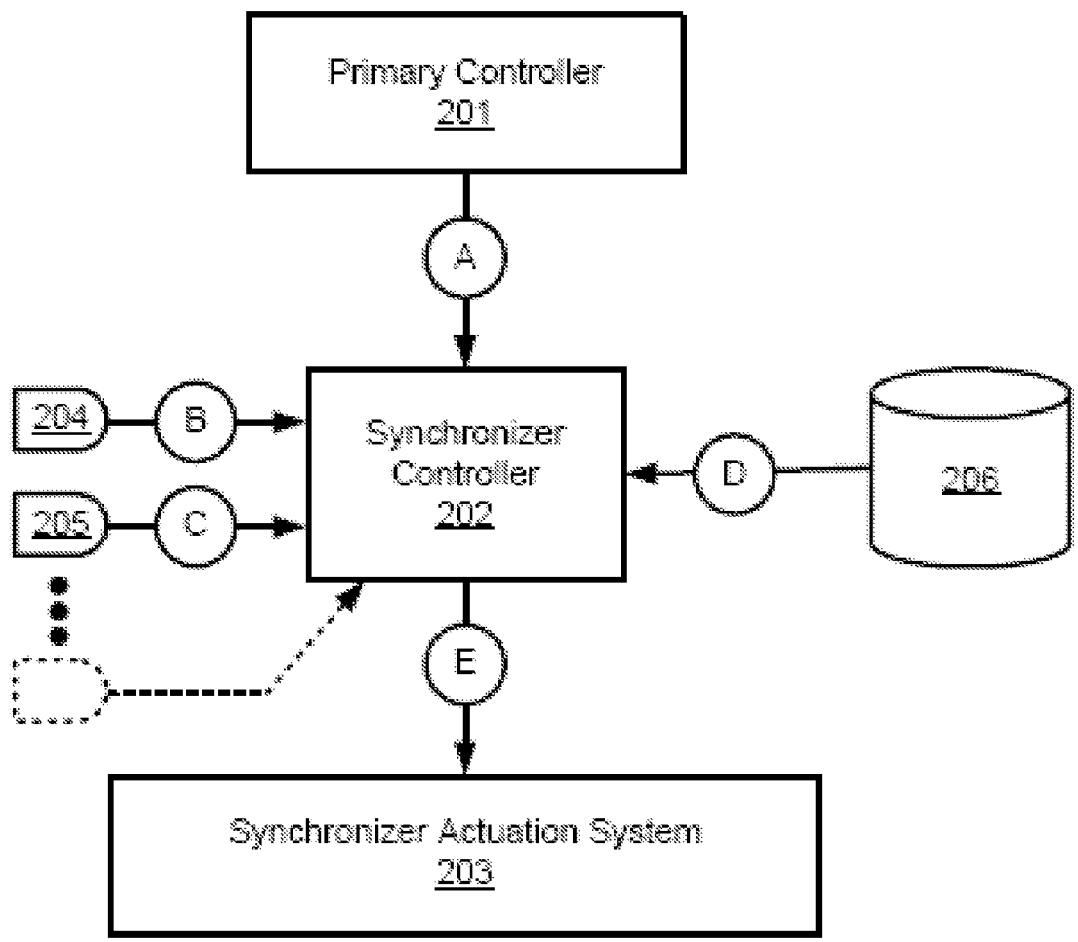
FIG. 2 is a schematic view of a transmission control and signaling architecture usable to implement various embodiments of the described principles.

To facilitate this, the relative speeds are measured and processed as shown in FIG. 2. In particular, FIG. 2 is a schematic view of a transmission control and signaling architecture usable to implement various embodiments of the described principles. The illustrated transmission control and signaling architecture 200 includes a primary controller 201, which in an embodiment is responsible for initiation of the synchronizer actuation and may also be responsible for controlling other transmission and engine functions. The primary controller 201 provides a synchronizer engagement command A when engagement of two relatively rotating elements is required, e.g., in the course of a range shift, direction shift, etc.

A synchronizer controller 202 receives the synchronizer engagement command A and executes a process to generate a synchronizer engagement force command E. In particular, as will be explained in greater detail later herein, the synchronizer controller 202 executes a force profile selection process based on received data to generate the synchronizer engagement force command E best suited to engage the synchronizer in question under measured circumstances. The force profile selection process takes as input either a theoretically calculated relative speed of the bodies to be synchronized or the measured individual speeds of the bodies from which the actual relative speed may be calculated, e.g., the difference between speed signal B from speed sensor 204 and speed signal C from speed sensor 205.

The selected force profile D may be stored in and retrieved from a memory or database 206. The memory or database 206 may be internal to or external to the synchronizer controller 202, and may be any suitable form of computer-readable memory, e.g., RAM, ROM, PROM, magnetic media, optical media, etc. The profiles may be stored in any format, e.g., vector form, point-by-point curve description, and so on, depending upon implementation preference as well as any data size and memory capacity limitations.

The synchronizer engagement force command E output by the synchronizer controller 202 describes an engagement force as a function of time. The synchronizer engagement force command E is received as input by the synchronizer actuation system 203. In general, the synchronizer actuation system 203 is a mechanism or arrangement for responding to a force request by applying the indicated force to a controlled synchronizer as an engagement force. The synchronizer actuation system 203 may be hydraulic, e.g., a piston forced by fluid controlled by an electrically-controller valve (e.g., a solenoid valve), or may be an electromechanical system such as a servo, worm drive, etc.

Figure 3:
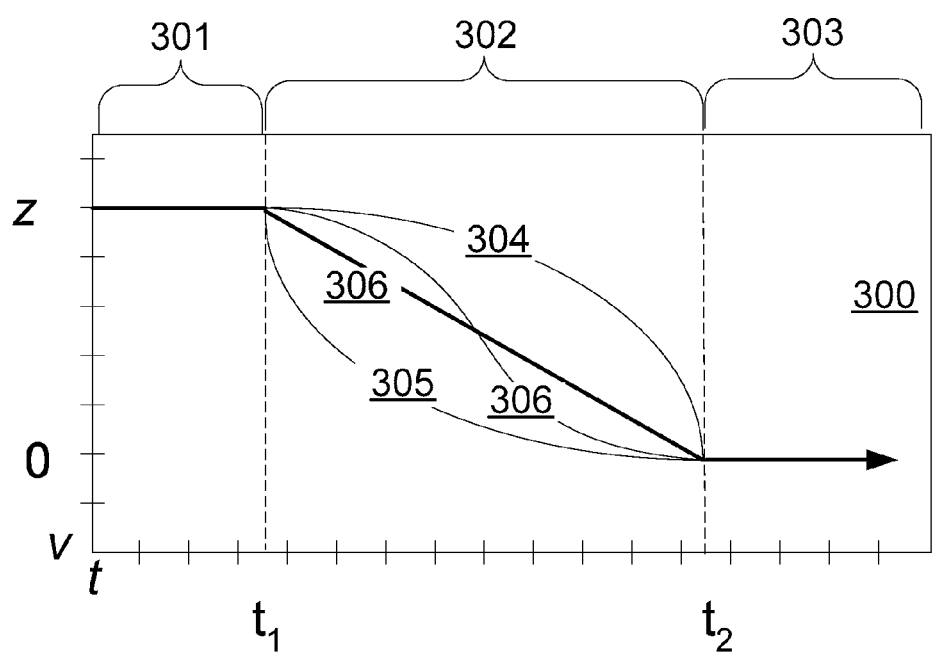
FIG. 3 is a simplified data plot showing relative speed of parts to be meshed.

As noted above, a synchronizer is a component used in a transmission to bring two rotating entities to a substantially similar rotational speed prior to full engagement. FIG. 3 is an idealized data plot showing the relative speed v (rpm) of parts being meshed as a function of time (t) in several example situations. The relative speed plot 300 shows three time windows, namely window 301, which includes the period up to the time $t_1$ that synchronization is requested, window 302, which covers the period from $t_1$ to $t_2$ during which synchronization occurs, and window 303, which covers the period after time $t_2$ when synchronization has completed.

As can be seen, the relative speed between the parts to be meshed during period 301 prior to synchronization is an essentially constant value z. At time $t_1$, when synchronization commences, the relative speed follows one of four basic types of trajectories. In the first type of trajectory 304, the relative speed is initially reduced gradually, and the change in relative speed increased dramatically as the speed difference decreases toward zero. In the second type of trajectory 305, the relative speed is again initially reduced gradually, and the change in relative speed increased dramatically as the speed difference decreases toward zero but then decrease again after passing through the halfway point with respect o relative speed.

The third trajectory type 306 represents an essentially linear change in relative speed during synchronization. Finally, the fourth trajectory type 307 includes an initial period of substantial change in the relative speed, followed by a lessening in the rate of change of the relative speed. As noted, these generalized plots are idealized, and an actual plot of relative speed during synchronization will generally be noisier and more varied.

While the relative speed plots of FIG. 3 represent general types of relative speed trajectory during synchronization, it will be appreciated that no specific trajectory type is always optimal for every relative speed. In particular, the energy differential embodied in a set of rotating parts to be meshed is an exponential function of the relative speed. As such, there is much more energy to be absorbed to mesh two parts having a high relative speed than to mesh two parts having a low relative speed.

In an embodiment, the synchronizer includes a cone clutch used to bring the relative speed between the two bodies of interest to zero. The higher the force applied to the cone clutch, the faster the synchronization occurs for any starting relative speed state. That is not to say that a faster profile is generally best, since the excessive force may increase clutch wear. The energy absorption capacity of the synchronizer material itself remains constant regardless of relative speed, and so the forcing profile is modified as a function of relative speed to stay within the synchronizer energy absorption capacity in an embodiment.

Figure 4:
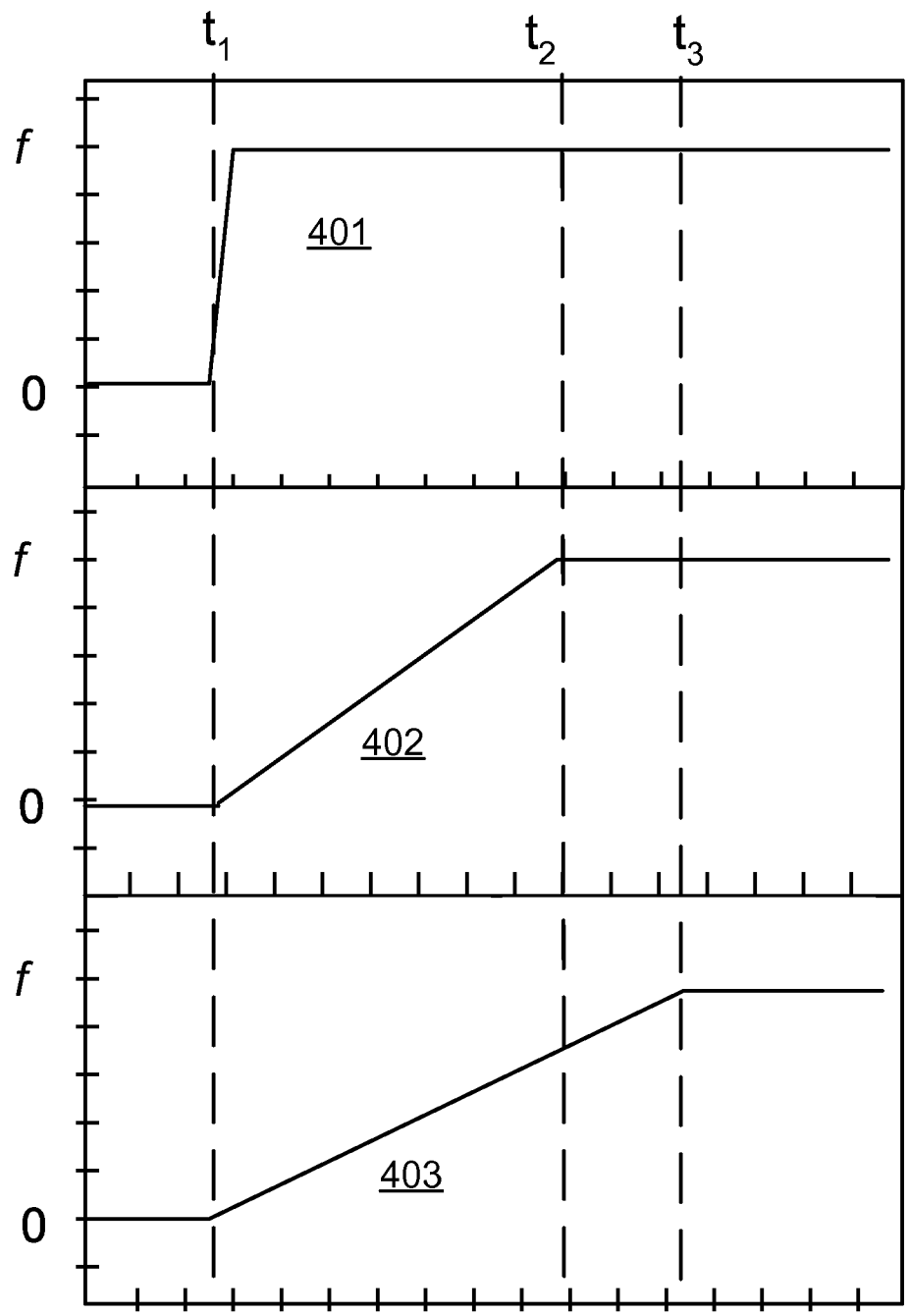
FIG. 4 is a plot of exemplary synchronizer force profiles according to various aspects of the described principles.

To this end, FIG. 4 illustrates a series of synchronizer force profiles including a first synchronizer force profile 401, a second synchronizer force profile 402, and a third synchronizer force profile 403. The first synchronizer force profile 401 is used when the relative speed is small, e.g., when the energy embodied in the relative speed is well within the ability of the synchronizer material to absorb and dissipate in a short period of time. Thus, within the first synchronizer force profile 401, the initial force applied is zero, indicating nonengagement. When the synchronizer actuation commences at time $t_1$, the force changes to a constant engagement force f.

The second synchronizer force profile 402 is used when the relative speed is moderate, e.g., when the energy embodied in the relative speed is well within the ability of the synchronizer material to absorb and dissipate if spread over a given time period ($t_2-t_1$). Thus, within the second synchronizer force profile 402, the initial force applied is again zero, and when the synchronizer actuation commences at time $t_1$, the force changes to a linearly increasing engagement force, peaking at an engagement force f at time $t_2$, and remaining constant thereafter.

The third synchronizer force profile 403 is used when the relative speed is high, e.g., when the energy embodied in the relative speed is too high to be safely absorbed with the time period ($t_2-t_1$), but may be absorbed without damage to the synchronizer within an extended time period ($t_3-t_1$). Thus, within the third synchronizer force profile 403, the initial force applied is again zero, and when the synchronizer actuation commences at time $t_1$, the force changes to a linearly increasing engagement force. The rate of increase in engagement force is lower in the third synchronizer force profile 403 than in the second synchronizer force profile 402 to allow a longer time for the higher energy of engagement to be absorbed. Thus, the increase in force again peaks at an engagement force f albeit at a later time $t_3$, and remains constant thereafter.

As noted, engagement with an aggressive profile such as the first synchronizer force profile 401 while there is substantial relative speed may result in an abrupt engagement causing damage to the machine and providing an uncomfortable user experience. Conversely, using a more passive profile such as the third synchronizer force profile 403 when there is insubstantial relative speed may result in a lagging shift and unnecessary frictional wear on clutch and machine components.

Viewed slightly differently, each force profile 401, 402, 403, has a duration or time period for synchronization, and a force slope that increases over time. In the illustrated examples, the force slope is inversely correlated to changes in the starting relative speed, such that higher starting relative speeds yield shallower force slopes. Similarly, the time period for engagement in positively correlated to changes in the starting relative speed in that higher starting relative speeds yield longer time period for engagement. In this way, the higher energy associated with higher relative speeds may be absorbed without damage or excess wear.

Figure 5:
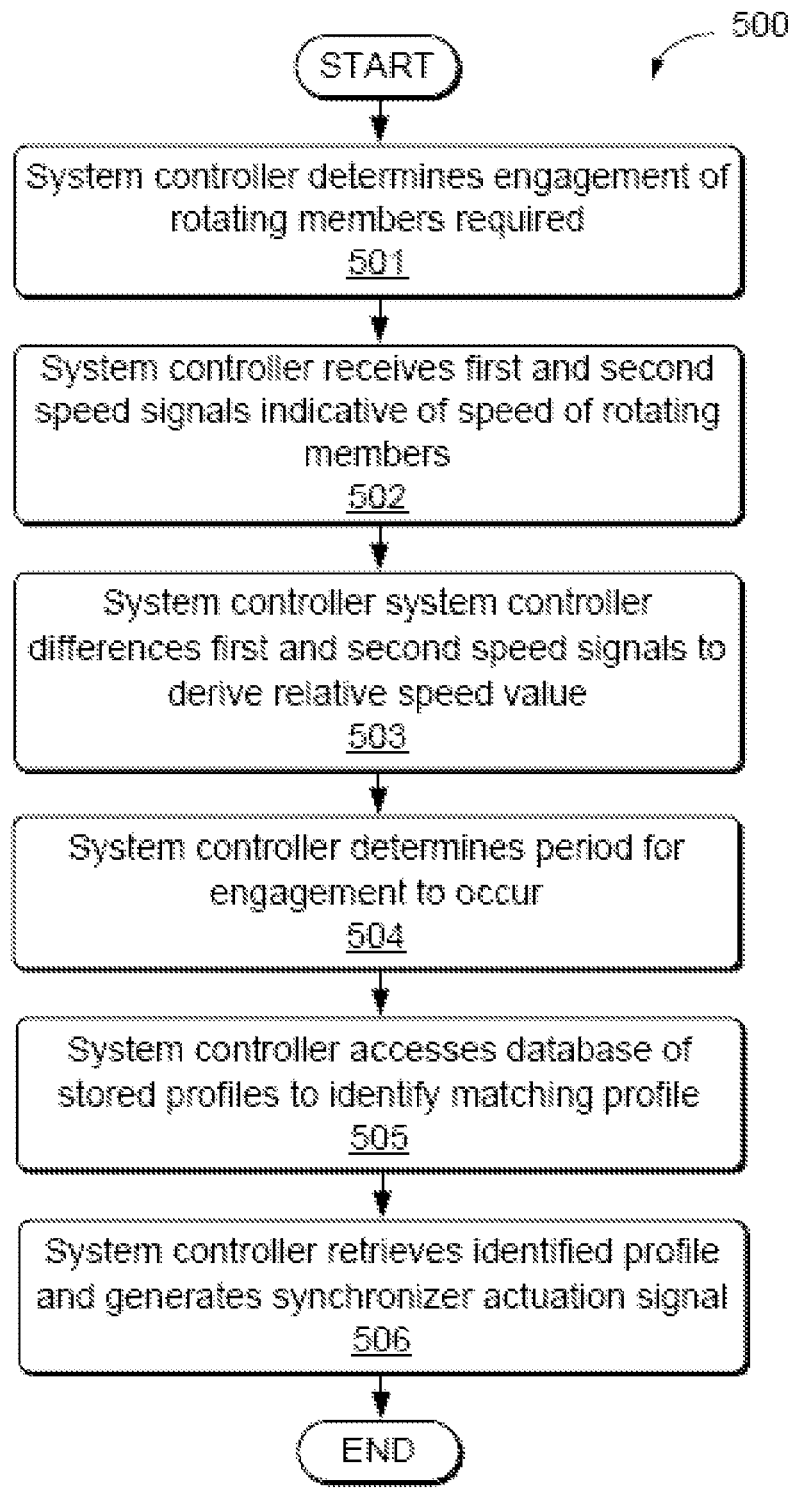
FIG. 5 is a flowchart illustrating a process of synchronizer force profile selection and application in an embodiment of the described principles.

Thus, it is advantageous to apply an appropriate profile based on the measured relative speed, but without the computational overhead of recalculating and adjusting individual profile points during the engagement. As such, in an embodiment, predetermined profiles are retrieved and applied as discussed above. An exemplary process for synchronizer actuation 500 is shown in FIG. 5. The description of FIG. 5 will refer generally to the system architecture shown in FIG. 2, with the primary controller 201 and synchronizer controller 202 being referred to collectively as the system controller. However, it will be appreciated that the system controller may instead be composed of a single physical controller or, conversely, a larger number of dedicated controllers.

At the first stage 501 of the process for synchronizer actuation 500, the system controller determines that the engagement of two rotating members is required, e.g., to execute a range shift, gear shift, etc. In order to execute the engagement, the system controller determines the relative speed (speed difference) between the two rotating members. Thus at stage 502, the system controller receives a first speed signal indicative of the speed of one rotating member and a second speed signal indicative of the speed of the remaining rotating member. At stage 503, the system controller differences the first and second speed signals to derive a relative speed value.

The system controller determines at stage 504 the period of time within which engagement should occur. For example, a shift under power may be required to complete within a much shorter time than a shift when the system is only lightly accelerating. Similarly, in a system where on-going and off-going engagements must be coordinated, the time allowed for the engagement may be fixed by, or at least based on, the engagement or disengagement time required by another component.

Having derived the relative speed value and identified time within which engagement should occur, the system controller accesses a database of stored profiles at stage 505 to identify a profile that is calculated to dissipate the relative speed within the allowed time for engagement. Although most aggressive profiles beyond a certain point will fulfill that criteria, the system controller in an embodiment selects the least aggressive profile that will still meet the time and speed criteria. This enables the engagement to occur as needed without imposing unnecessary strain on the synchronizer or other system components.

At stage 506, the system controller retrieves the identified profile and generates a corresponding synchronizer actuation signal. In an embodiment, because the profile is a series of values over time, the synchronizer actuation signal comprises a series of force values, e.g., solenoid actuation values calculated to yield the desired force at each moment of interest according to the selected force profile. In this way, the applied force accommodates the speed to be dissipated within the allotted time, without excessively aggressive or passive actuation of the synchronizer.

Although the synchronizer has been discussed herein primarily as a fluid actuated system, it will be appreciated that other synchronizer types will also benefit from the described principles. In particular, electromechanical and other synchronizer types will benefit from the application of a selected pre-generated force profile that dissipates the energy of relative rotation in a way that is least disruptive and damaging.

The described principles entail the retrieval, calculation, and/or derivation of certain values and/or signals. These manipulations are executed, in an embodiment, via the computerized manipulation of electrical signals, whether digital or analog, and the interaction of the resultant signals with electrically responsive members such as elctrohydraulic and electromechanical actuators.

As such, the controllers discussed herein may be implemented as processor-driven controllers, operating via computer-executable instructions read from a nontransitory computer-readable medium such as a hard drive, disc drive, flash drive, ROM, PROM, RAM, etc. Data values received provided, and/or manipulated may be provided in digital or analog form.

The exact nature of the members being synchronized is not critical, but in an embodiment, the synchronizer is associated with a clutch member of a multiclutch transmission system. In another embodiment, the synchronizer is associated with a main drive clutch of a machine.

INDUSTRIAL APPLICABILITY

The described principles are applicable to machines and devices requiring synchronization of rotating members prior to the meshing or engagement of those members. Thus, in general, the synchronizer system described herein finds beneficial application in clutch systems, brake systems, and other industrial systems.

Examples of machines within which the synchronizer system may be used include multiclutch transmission systems found in industrial operation and transportation machines such as wheel loaders, earth-moving machines, excavators, dump trucks, backhoes, motorgraders, material handlers, locomotives, pavers or the like. The disclosed principles are not limited to any machines having any particular power system, but rather are applicable within machines having internal combustion, electric, hybrid, hydraulic, and other drive system types.

It will be appreciated that the foregoing embodiments provide only examples of the disclosed system and technique. As such, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method of synchronizing a plurality of rotating parts for engagement, the method comprising:
   receiving a request for engagement of the plurality of rotating parts to one another;
   determining a starting relative speed of the plurality of rotating parts;
   based on the starting relative speed, determining a time period over which the engagement is to occur and selecting a predetermined synchronizer force profile for synchronizing the plurality of parts prior to engagement;
   retrieving and applying the selected predetermined synchronizer force profile to a synchronizer between the plurality of parts to be engaged for the determined time period over which the engagement is to occur; and
   when the relative speed between the plurality of parts to be engaged becomes substantially zero, engaging the plurality of parts to one another.

2. The method of synchronizing a plurality of rotating parts for engagement according to claim 1, wherein the starting relative speed is a calculated relative speed.

3. The method of synchronizing a plurality of rotating parts for engagement according to claim 1, wherein the starting relative speed is a measured relative speed.

4. The method of synchronizing a plurality of rotating parts for engagement according to claim 1, wherein applying the selected predetermined synchronizer force profile includes applying the selected predetermined synchronizer force profile via a cone clutch synchronizer.

5. The method of synchronizing a plurality of rotating parts for engagement according to claim 1, wherein the determined time period over which the engagement is to occur is positively correlated to the starting relative speed.

6. The method of synchronizing a plurality of rotating parts for engagement according to claim 1, wherein each force profile has an associated force slope, and wherein the associated force slopes are inversely correlated to the starting relative speed.

7. The method of synchronizing a plurality of rotating parts for engagement according to claim 1, wherein applying the selected predetermined synchronizer force profile to a synchronizer between the plurality of parts to be engaged comprises providing a synchronizer actuation command to a synchronizer actuator.

8. The method of synchronizing a plurality of rotating parts for engagement according to claim 7, wherein the synchronizer actuator is a solenoid controlled hydraulic actuator and wherein the synchronizer actuation command comprises an electronic solenoid command.

9. The method of synchronizing a plurality of rotating parts for engagement according to claim 7, wherein the synchronizer actuator is an electromechanical actuator including at least one of a servo and a worm drive.

* * * * *